July 16, 1968 H. J. HARTMANN ET AL 3,393,091
METHOD OF PRODUCING SEMICONDUCTOR ASSEMBLIES
Filed Aug. 19, 1965
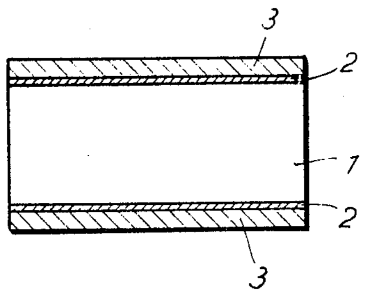
INVENTORS
Horst Joachim Hartmann
Hermann Wiedmann
Michael J. Striker
ATTORNEY United States Patent Office 3,393,091

Patented July 16, 1968

3,393,091
METHOD OF PRODUCING SEMICONDUCTOR ASSEMBLIES

Horst Joachim Hartmann, Korb-Waiblingen, and Hermann Widmann, Stuttgart-Feuerbach, Germany, assignors to Robert Bosch G.m.b.H., Stuttgart Germany Filed Aug. 19, 1965, Ser. No. 481,452
Claims priority, application Germany, Aug. 25, 1964, B 78,249
17 Claims. (Cl. 117—217)

The present invention relates to a method of producing semiconductor assemblies, and more particularly, the present invention is concerned with a semiconductor assembly based on a monocrystalline semiconductive body. According to a preferred embodiment, the present invention is concerned with producing a rectifier arrangement based on a monocrystalline silicon body and including a surface layer on the silicon body which consists of a eutectic formed of a suitable metal and the silicon of said body, said rectifier arrangement also including at least one nickel contact electrode layer plated onto the eutectic surface layer.

In most semiconductor assemblies, the efficiency of the device under operating conditions will depend on the properties and quality of the contact between the electrode and the semiconductive body. The contact resistance between the electrode and the semiconductive body should be low and the connection between the electrode and the semiconductor body should be of high mechanical strength and should permit soldering of the electrode to a conductor. Electrode contacts or connections of high-voltage current rectifiers of this kind, furthermore, must be capable of withstanding high electric loads.

It is an object of the present invention to provide a method of producing semiconductor assemblies which fulfill all of the above mentioned requirements.

It is a further object of the present invention to provide a method of producing semiconductor assemblies which can be carried out in a simple and economical manner and will result in very firm adherence of the electrode layer to the semiconductive body.

Other objects and advantages of the present invention will become apparent from a further reading of the description and of the appended claims.

With the above and other objects in view, the present invention contemplates a method of producing a semiconductor assembly, comprising the steps of forming at the surface of a semiconductive, monocrystalline silicon body a eutectic layer consisting essentially of silicon and of a metal adapted to form a eutectic with silicon, treating the thus formed eutectic surface layer of the monocrystalline silicon body with a solution containing nickel and fluorine ions so as to activate the eutectic surface thereby facilitating the deposition of a nickel electrode layer thereto, and forming on the thus activated surface by reduction of a nickel salt with sodium hypophosphite a nickel electrode layer firmly adhering to the surface.

According to a preferred embodiment, the method of producing a semiconductor arrangement in accordance with the present invention, comprises the steps of etching at least a portion of the surface of a semiconductive, monocrystalline silicon body with concentrated aqueous hydrofluoric acid saturated with dissolved potassium bichromate; thereafter further etching said surface with an aqueous solution of sodium hydroxide and potassium hydroxide having a complex former dissolved therein; subjecting the thus etched surface of said monocrystalline silicon body under a high vacuum to vapor deposition of a metal which is able to alloy with silicon, for example silver or gold so as to deposit said metal on the surface of said silicon body; heating the thus treated body in a protective atmosphere and at a temperature above the eutectic temperature of the combination of said metal and silicon so as to form a eutectic of said metal on at least a surface portion of said silicon body; treating the thus formed eutectic surface layer of said monocrystalline silicon body with a concentrated aqueous solution of nickel chloride and ammonium fluoride having a pH of between 3 and 1 so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

Thus, according to the present invention, the surface of the eutectic layer which has been formed on the semiconductive, monocrystalline silicon body, is first activated by treatment with a solution containing nickel and fluorine ions, and thereafter, on the thus activated surface, the nickel electrode is formed by reduction of a nickel salt with sodium hypophosphite. A particularly suitable activating bath for the purpose of the present invention consists of an aqueous solution of nickel chloride and ammonium fluoride.

In accordance with a further embodiment of the present invention, a particularly uniform and thin, and consequently economical to produce, layer is obtained by applying the metal of the eutectic to the surface of the semiconductive body by vapor deposition in a high vacuum, followed by heating in a protective atmosphere at a temperature which is higher than the melting point of the eutectic formed during such heating of the semiconductive body, preferably silicon, with the vapor deposited metal, preferably silver or gold. In addition, it is advantageous to subject the semiconductive body prior to vapor deposition of the metal thereon, to etching with an aqueous solution of fluoric acid which contains, and preferably is saturated with potassium bichromate followed by etching with an aqueous solution of potassium hydroxide and sodium hydroxide. Most preferably, a complex former is dissolved in the aqueous potassium hydroxide and sodium hydroxide etching solution, which complex former may consist of sodium citrate and sodium tartrate, or of ethylenediamine tetra-acetic acid.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the figure is a schematic cross sectional view of a semiconductor arrangement produced in accordance with the method of the present invention.

The present method will now be further described by way of example and with reference to the drawing, without, however, being limited to the specific details of the example.

The semiconductive body of a semiconductor rectifier consists of a silicon disc 1, having a thickness of 200 microns, and which has been doped by solid body diffusion with boron and phosphorus. The silicon disc is first etched with a concentrated, about 38–40% aqueous solution of hydrofluoric acid which had been saturated with potassium bichromate. The potassium bichromate may also be replaced with sodium bichromate or ammonium bichromate. This acidic etching is followed by a short period of etching in an aqueous solution of potassium hydroxide and sodium hydroxide. The ratio of potassium hydroxide to sodium hydroxide in the etching solution is maintained at 1:1. The total concentration of hydroxide, in the aqueous solution is maintained between 0.1 and 30% and preferably at 25% by weight. In order to facilitate complex formation, sodium citrate and sodium tartrate are incorporated in the hydroxide solution. Alternatively, ethylenediamine tetra-acetic acid may be incorporated as a complex former in the hydroxide solution. The total concentration of complex former in the hydroxide solution is maintained between 0.1 and 10% by weight. The acidic etching is carried out at room temperature and the hydroxide etching in the boiling solution. It is important to maintain the etching sequence so that first the acidic etching is carried out and thereafter the basic etching, in order to remove any oxide film which may result from the acidic etching, and this has to be done prior to the subsequent vacuum deposition of silver or gold. The length of time for which the two etching steps are to be carried out, depends on the amount of silicon which is to be removed from the surface of the silicon disc.

After completion of the two etching steps, silicon disc 1 is thoroughly washed and dried and thereafter silver (or gold) is deposited by vapor deposition onto the two opposite faces of the silicon disc under conditions of high vacuum. The thickness of each of the thus deposited silver layers, equals about 0.5 micron. Thereafter, silicon disc 1, with silver or gold deposited thereon, is heated either under conditions of high vacuum or in a protective gas atmosphere of hydrogen or of a mixture of hydrogen and nitrogen, containing preferably 90 vol. percent $N_2$ and 10 vol. percent $H_2$, at a temperature of 900° C. for a period of about fifteen minutes. During this heating, the silver layers melt together with a thin surface layer of silicon disc 1 and, upon subsequent cooling, the molten surface zone solidifies at a temperature of 830° C. as silver-silicon eutectic layer 2. The silicon content of eutectic layer 2 equals 4.5% by weight.

The free surface of eutectic layer 2 is now chemically nickel plated to form thereon nickel layer 3.

In order to achieve a spontaneous start of the nickel plating reaction, silicon body 1 with eutectic layer 2 thereon, is subjected, prior to application of the nickel layer, to activation by treatment with an activating solution. Activating treatment is carried out a ambient temperature.

The activating solution may consist of a concentrated aqueous hydrofluoric acid solution of 38–40% HF plus nickel chloride ($NiCl_2.6H_2O$) or of aqueous solutions of either hydrofluoric acid plus nickel chloride, more dilute, or of KF.HF plus nickel chloride, or of $KBF_4$ plus nickel chloride, or $NH_4F$ plus nickel chloride or KF plus nickel chloride.

These compounds are dissolved in de-ionized water, whereby first the fluorine compound and thereafter the nickel chloride is introduced into the water.

The solutions of hydrofluoric acid and nickel chloride are acidic solutions, and the solutions of the other fluorine-containing compounds become acidic upon introduction of the nickel chloride. Additionally, small amounts (0.001–0.1 mole per liter) of gold, palladium or platinum salts may be incorporated in the solution. The spontaneous start of the subsequent nickel plating reaction and the effect of the activation improve with increasing acidity of the activating solution. Preferably, the pH of the activating solution will be between 3 and 1, although it is also possible to obtain a sufficient degree of activation within a pH range of between 6 and 0. The concentration of nickel and fluorine ions within the activating solution may vary between concentration as low as 0.01 mol and a saturated solution. Preferably, a highly concentrated activating solution is used, which will correspond to the preferred pH range of between 3 and 1. The silicon discs are maintained in the activating solutions from about ¼ minute to about 5 minutes. This time depends on the pH value of the activating solution. At a pH value of 1 the discs are preferably activated for about ¼ minute and at a pH value of 6 for about 5 minutes.

The subsequent nickel plating is preferably carried out in accordance with the method of Kanigan by reduction of nickel chloride with sodium hypophosphite. The silicon disc 1 with activated eutectic layer 2 thereon is, immediately after completion of activation, placed into a boiling aqueous solution of these salts. Nickel deposition will start immediately, provided that the activation was carried out properly, and the start of the nickel deposition reaction can be recognized by the spontaneous formation of hydrogen gas bubbles. The nickel chloride of the nickel plating solution can also be replaced by other nickel salts, for instance nickel sulphate, and the sodium hypophosphite may be replaced by other suitable reducing agents. The chemical nickel plating is terminated when the nickel layer 3 has reached a thickness of about 2 microns.

In this manner, a nickel layer is formed on the semiconductive silicon body in a simple manner, and the thus formed nickel layer 3 adheres very firmly to the eutectic layer. Furthermore, nickel layer 3 may be relatively vary thin and still will excellently serve its purpose. Instead of depositing nickel layer 3 from a redox solution, it is also possible to form nickel layer 3 by electro plating.

The silver-silicon eutectic or the corresponding gold-silicon eutectic, have high melting points so that neither upon soldering of conductive members to the nickel electrode layer, nor during subsequent operation of the device, melting of eutectic layer 2 and, in connection therewith, separation of nickel electrode layer 3 will occur.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a semiconductor assembly, comprising the steps of forming at the surface of a monocrystalline semiconductor a eutectic layer consisting essentially of said semiconductor and of a metal adapted to form a eutectic therewith; treating the thus formed eutectic surface layer of said monocrystalline semiconductor with a solution including nickel and fluorine ions so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

2. A method of producing a semiconductor assembly, comprising the steps of forming at the surface of a semiconductive, monocrystalline silicon body a eutectic layer consisting essentially of silicon and of a metal adapted to form a eutectic with silicon; treating the thus formed eutectic surface layer of said monocrystalline silicon body with a solution containing nickel and fluorine ions so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

3. A method of producing a semiconductor assembly, comprising the steps of forming at the surface of a semiconductive, monocrystalline silicon body a eutectic layer consisting essentially of silicon and of a metal adapted to form a eutectic with silicon and selected from the group consisting of silver and gold; treating the thus formed eutectic surface layer of said monocrystalline silicon body with a solution containing nickel and fluorine ions so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

4. A method of producing a semiconductor assembly, comprising the steps of forming at the surface of a semiconductive, monocrystalline silicon boly a eutectic layer consisting essentially of silicon and of a metal adapted to form a eutectic with silicon; treating the thus formed eutectic surface layer of said monocrystalline body with an aqueous solution of nickel chloride and ammonium fluoride so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

5. A method of producing a semiconductor assembly, comprising the steps of forming at the surface of a semiconductive, monocrystalline silicon body a eutectic layer consisting essentially of silicon and of a metal adapted to form a eutectic with silicon; treating the thus formed eutectic surface layer of said monocrystalline silicon body with a concentrated aqueous solution of nickel chloride and ammonium fluoride so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

6. A method of producing a semiconductor assembly, comprising the steps of forming at the surface of a semiconductive, monocrystalline silicon body a eutectic layer consisting essentially of silicon and of a metal adapted to form a eutectic with silicon; treating the thus formed eutectic surface layer of said monocrystalline silicon body with a solution containing nickel and fluorine ions having a pH of between 6 and 0 so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

7. A method of producing a semiconductor assembly, comprising the steps of forming at the surface of a semiconductive, monocrystalline silicon body a eutectic layer consisting essentially of silicon and of a metal adapted to form a eutectic with silicon; treating the thus formed eutectic surface layer of said monocrystalline silicon body with a solution containing nickel and fluorine ions having a pH of between 3 and 1 so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

8 A method of producing a semiconductor assembly, comprising the steps of forming at the surface of a semiconductive, monocrystalline silicon body a eutectic layer consisting essentially of silicon and of a metal adapted to form a eutectic with silicon; treating the thus formed eutectic surface layer of said monocrystalline silicon body with a solution containing nickel and fluorine ions in a concentration of at least 0.01 mol so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

9. A method of producing a semiconductor assembly, comprising the steps of forming at the surface of a semiconductive, monocrystalline silicon body a eutectic layer consisting essentially of silicon and of a metal adapted to form a eutectic with silicon; treating the thus formed euectic surface layer of said monocrystalline silicon body with a saturated aqueous solution of nickel chloride and ammonium fluoride so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

10. A method of producing a semiconductor assembly, comprising the steps of forming at the surface of a semiconductive, monocrystalline silicon body a eutectic layer consisting essentially of silicon and of a metal adapted to form a eutectic with silicon and selected from the group consisting of silver and gold; treating the thus formed eutectic surface layer of said monocrystalline silicon body with a concentrated aqueous solution of nickel chloride and ammonium fluoride having a pH of between 3 and 1 so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

11. A method of producing a semiconductor assembly, comprising the steps of subjecting at least a portion of the surface of a semiconductive, monocrystalline silicon body under a high vacuum to vapor deposition of a metal selected from the group consisting of silver and gold so as to deposit said metal on the surface of said silicon body; heating the thus treated body in a protective atmosphere and at a temperature above the eutectic temperature of the combination of said metal and silicon so as to form a eutectic of said metal and at least a surface portion of said silicon body; treating the thus formed eutectic surface layer of said monocrystalline silicon body with a solution containing nickel and fluorine ions so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

12. A method of producing a semiconductor assembly, comprising the steps of etching at least a portion of the surface of a semiconductive, monocrystalline silicon body with concentrated aqueous hydrofluoric acid having potassium bichromate dissolved therein; thereafter further etching said surface with an aqueous solution of sodium hydroxide and potassium hydroxide; subjecting the thus etched surface of said monocrystalline silicon body under a high vacuum to vapor deposition of a metal selected from the group consisting of silver and gold so as to deposit said metal on the surface of said silicon body; heating the thus treated body in a protective atmosphere and at a temperature above the eutectic temperature of the combination of said metal and silicon so as to form a eutectic of said metal and at least a surface portion of said silicon body; treating the thus formed eutectic surface layer of said monocrystalline silicon body with a solution containing nickel and fluorine ions so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

13. A method of producing a semiconductor assembly, comprising the steps of etching at least a portion of the surface of a semiconductive, monocrystalline silicon body with concentrated aqueous hydrofluoric acid being saturated with dissolved potassium bichromate; thereafter further etching said surface with an aqueous solution of sodium hydroxide and potassium hydroxide; subjecting the thus etched surface of said monocrystalline silicon body under a high vacuum to vapor deposition of a metal selected from the group consisting of silver and gold so as to deposit said metal on the surface of said silicon body; heating the thus treated body in a protective atmosphere and at a temperature above the eutectic temperature of the combination of said metal and silicon so as to form a eutectic of said metal and at least a surface portion of said silicon body; treating the thus formed eutectlc surface layer of said monocrystalline silicon body with a solution containing nickel and fluorine ions so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

14. A method of producing a semiconductor assembly, comprising the steps of etching at least a portion of the surface of a semiconducive, monocrystalline silicon body with concentrated aqueous hydrofluoric acid having potassium bichromate dissolved therein; thereafter further etching said surface with an aqueous solution of sodium hydroxide and potassium hydroxide having as complex former sodium citrate and sodium tartrate dissolved therein; subjecting the thus etched surface of said monocrystalline silicon body under a high vacuum to vapor deposition of a metal selected from the group consisting of silver and gold so as to deposit said metal on the surface of said silicon body; heating the thus treated body in a protective atmosphere and at a temperature above the eutectic temperature of the combination of said metal and silicon so as to form a eutectic of said metal and at least a surface portion of said silicon body; treating the thus formed eutectic surface layer of said monocrystalline silicon body with a solution containing nickel and fluorine ions so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

15. A method of producing a semiconductor assembly, comprising the steps of etching at least a portion of the surface of a semiconductive, monocrystalline silicon body with concentrated aqueous hydrofluoric acid having potassium bichromate dissolved therein; thereafter further etching said surface with an aqueous solution of sodium hydroxide and potassium hydroxide having as complex former ethylenediamine tetra-acetic acid dissolved therein; subjecting the thus etched surface of said monocrystalline silicon body under a high vacuum to vapor deposition of a metal selected from the group consisting of silver and gold so as to deposit said metal on the surface of said silicon body; heating the thus treated body in a protective atmosphere and at a temperature above the eutectic temperature of the combination of said metal and silicon so as to form a eutectic of said metal and at least a surface portion of said silicon body; treating the thus formed eutectic surface layer of said monocrystalline silicon body with a solution containing nickel and fluorine ions so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

16. A method of producing a semiconductor assembly, comprising the steps of etching at least a portion of the surface of a semiconductive, monocrystalline silicon body with concentrated aqueous hydrofluoric acid being saturated with dissolved potassium bichromate; thereafter further etching said surface with an aqueous solution of sodium hydroxide and potassium hydroxide having a complex former dissolved therein; subjecting the thus etched surface of said monocrystalline silicon body under a high vacuum to vapor deposition of a metal selected from the group consisting of silver and gold so as to deposit said metal on the surface of said silicon body; heating the thus treated body in a protective atmosphere and at a temperature above the eutectic temperature of the combination of said metal and silicon so as to form a eutectic of said metal and at least a surface portion of said silicon body; treating the thus formed eutectic surface layer of said monocrystalline silicon body with a concentrated aqueous solution of nickel chloride and ammonium fluoride having a pH of between 3 and 1 so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

17. A method of producing a semiconductor assembly, comprising the steps of etching at least a portion of the surface of a semiconductive, monocrystalline silicon body with concentrated aqueous hydrofluoric acid having potassium bichromate dissolved therein; thereafter further etching said surface with an alkaline solution; subjecting the thus etched surface of said monocrystalline silicon body under a high vacuum to vapor deposition of a metal selected from the group consisting of silver and gold so as to deposit said metal on the surface of said silicon body; heating the thus treated body in a protective atmosphere and at a temperature above the eutectic temperature of the combination of said metal and silicon so as to form a eutectic of said metal and at least a surface portion of said silicon body; treating the thus formed eutectic surface layer of said monocrystalline silicon body with a solution containing nickel and fluorine ions so as to activate said eutectic surface thereby facilitating firm adherence of a nickel electrode layer thereto; and forming on the thus activated surface by reduction of a nickel salt with sodium hypophosphite a nickel electrode layer firmly adhering to said surface.

References Cited

UNITED STATES PATENTS

| | | | |
|---|---|---|---|
| 2,962,394 | 11/1960 | Andres | 117—217 X |
| 2,965,519 | 12/1960 | Christensen | 117—107 X |
| 2,995,473 | 8/1961 | Levi | 117—212 X |
| 3,158,504 | 11/1964 | Anderson | 117—107 X |
| 3,214,292 | 10/1965 | Edson | 117—160 X |

ALFRED L. LEAVITT, *Primary Examiner.*

C. K. WEIFFENBACH, *Assistant Examiner.*